United States Patent
Styles

(10) Patent No.: US 9,482,774 B2
(45) Date of Patent: Nov. 1, 2016

(54) VARIABLE TURN RADIUS FOR MARINE VESSELS

(71) Applicant: ION Geophysical Corporation, Houston, TX (US)

(72) Inventor: Angus Styles, Edinburgh (GB)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 14/697,085

(22) Filed: Apr. 27, 2015

(65) Prior Publication Data

US 2015/0309199 A1 Oct. 29, 2015

Related U.S. Application Data

(60) Provisional application No. 61/984,565, filed on Apr. 25, 2014.

(51) Int. Cl.
*G01V 1/38* (2006.01)
*G05D 1/02* (2006.01)
*G01C 21/20* (2006.01)
*B63B 21/66* (2006.01)

(52) U.S. Cl.
CPC ........... *G01V 1/3808* (2013.01); *G01C 21/203* (2013.01); *G05D 1/0206* (2013.01); *B63B 21/66* (2013.01)

(58) Field of Classification Search
CPC .. G01V 1/3808; B63H 25/00; G01C 21/203; G05D 1/0206
USPC ........................................................ 701/21
See application file for complete search history.

(56) References Cited

U.S. PATENT DOCUMENTS

| | | | | |
|---|---|---|---|---|
| 3,786,408 A | * | 1/1974 | Jenkinson | G01V 1/3808 367/21 |
| 4,404,664 A | * | 9/1983 | Zachariadis | B63G 8/42 114/246 |
| 4,821,241 A | * | 4/1989 | Berglund | G01V 1/201 174/101.5 |
| 2005/0114033 A1 | * | 5/2005 | Ray | G01V 1/223 702/14 |
| 2007/0127312 A1 | | 6/2007 | Storteig et al. | |
| 2007/0165486 A1 | | 7/2007 | Moldoveanu et al. | |
| 2008/0285381 A1 | * | 11/2008 | Moldoveanu | G01V 1/3808 367/20 |
| 2009/0157242 A1 | | 6/2009 | Holo et al. | |
| 2011/0203509 A1 | | 8/2011 | Austad et al. | |
| 2012/0069702 A1 | | 3/2012 | Muyzert et al. | |
| 2013/0107663 A1 | * | 5/2013 | Moldoveanu | G01V 1/3817 367/16 |
| 2013/0265849 A1 | * | 10/2013 | Bunting | G01V 1/3826 367/16 |

FOREIGN PATENT DOCUMENTS

WO 2013169117 A1 11/2013

OTHER PUBLICATIONS

International Search Report for International Application No. PCT/US2015/027780 from European Patent Office, on Jul. 9, 2015.

\* cited by examiner

*Primary Examiner* — McDieunel Marc
*Assistant Examiner* — James E Stroud
(74) *Attorney, Agent, or Firm* — Holland & Hart LLP

(57) ABSTRACT

Operation of a marine vessel is disclosed. A marine vessel may be operated so as to determine that an end of a first sail line is approaching. Once determined, a turn path from the end of the first sail line to the beginning of a second sail line may be determined. The turn path may be determined based on at least one of current direction and current magnitude.

12 Claims, 17 Drawing Sheets

Radius reduced as vessel turns into current – BSP reduced to maintain WSP

Radius reduced again as BSP is reduced further by current

VARIABLE TURN RADIUS FOR MARINE VESSELS

CROSS REFERENCES

This application claims priority to and the benefit of U.S. provisional patent application No. 61/984,565, titled "VARIABLE TURN RADIUS FOR MARINE VESSELS," filed Apr. 25, 2014, which is hereby incorporated by reference in its entirety for all purposes.

TECHNICAL FIELD

This disclosure relates generally to geophysical exploration systems, and more particularly to methods for acquiring seismic data.

BACKGROUND

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with one or more receivers in order to create an image of the subsurface of the Earth. By observing the reflected seismic wave detected by the receiver(s) during the survey, the geophysical data pertaining to reflected signals may be acquired and these signals may be used to form an image of the Earth near the survey location.

Each receiver may include, for example, a pressure sensor and/or a particle motion sensor in proximity to one another. The pressure sensor may be, for example, a hydrophone that records scalar pressure measurements of a seismic wavefield. The particle motion sensor may be, for example, a three-component geophone that records vectorial velocity measurements of the seismic wavefield. By observing the reflected seismic wavefield detected by the receiver(s) during the survey, the geophysical data pertaining to reflected signals may be acquired and these signals may be used to form an image indicating the composition of the Earth near the survey location.

Marine seismic surveys generally involve towing one or more streamer cables comprising a plurality of receivers with a seismic vessel. The number of receivers placed in the streamer and the relative distance between the receivers generally determines the quality of seismic data that is recorded. Improving seismic data collection has traditionally involved increasing the length of streamer cables and the density of receivers included therein. However, the longer the streamer cables, the more difficult it becomes to keep streamer cables separated and in a desired shape, for example, when turning the seismic vessel.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

DETAILED DESCRIPTION

Figure 1:
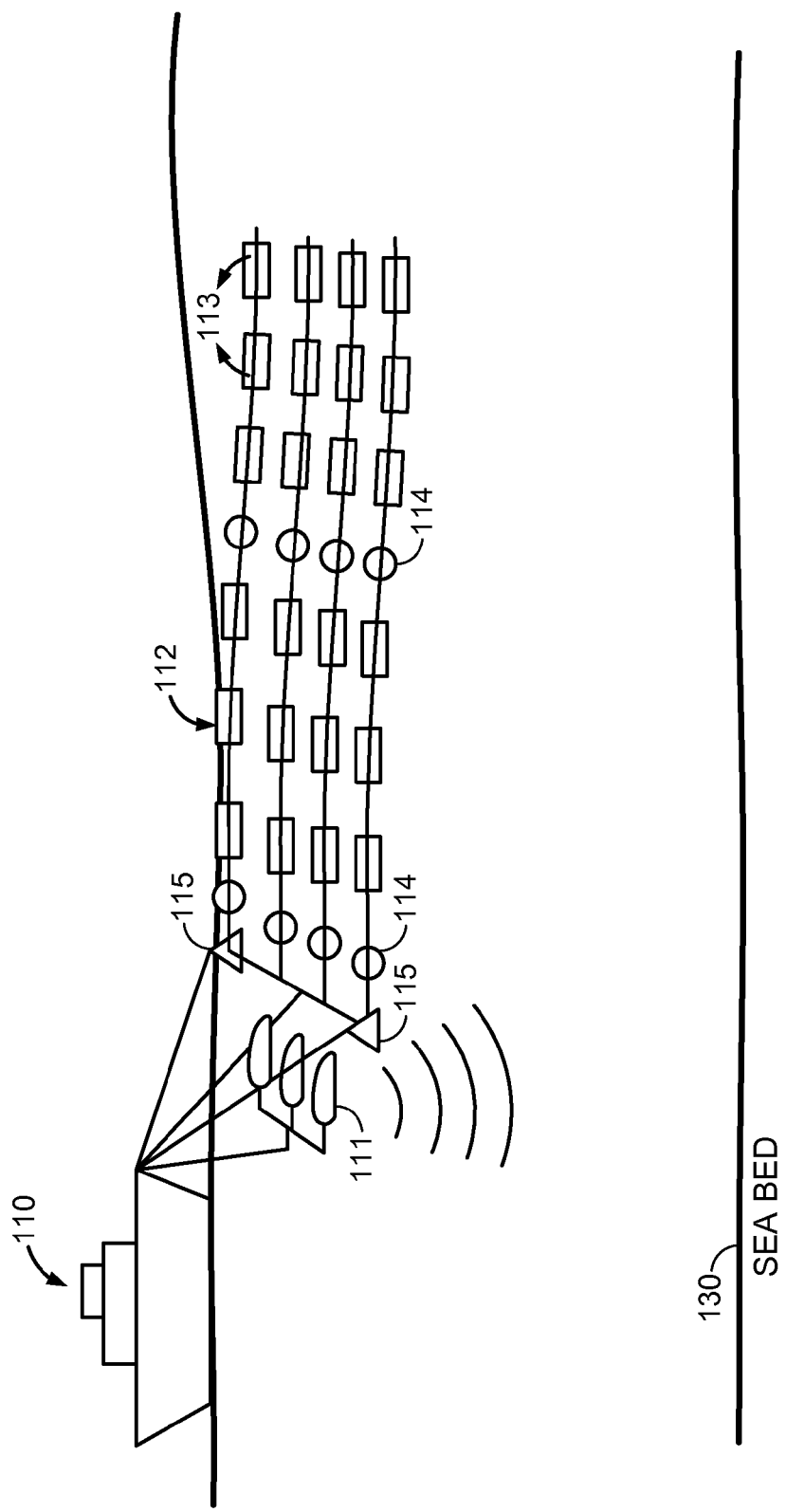
FIG. 1 illustrates an exemplary seismic survey according to an embodiment of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computerized system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a wireless network. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates an exemplary seismic survey according to an embodiment of the invention. As illustrated, a seismic vessel 110 may tow one or more seismic sources 111 and one or more streamer cables 112. Each streamer cable 112 may include a plurality of seismic sensors 113. Exemplary seismic sensors include any one or combinations of hydrophones, geophones, particle motion sensors such as accelerometers, and the like. In one embodiment, one or more steering devices 114 may be coupled to one or more of the cables 112. The steering devices may be configured to control depth and/or lateral position of a respective cable such that an acceptable shape of the streamer cable array is maintained. In one embodiment, the streamer cable array may also be equipped with one or more diverters (or paravanes) 115. The diverters 115 may cause the streamer cable array to spread when towed such that an acceptable distance is maintained between the streamer cables 112.

Figure 2:
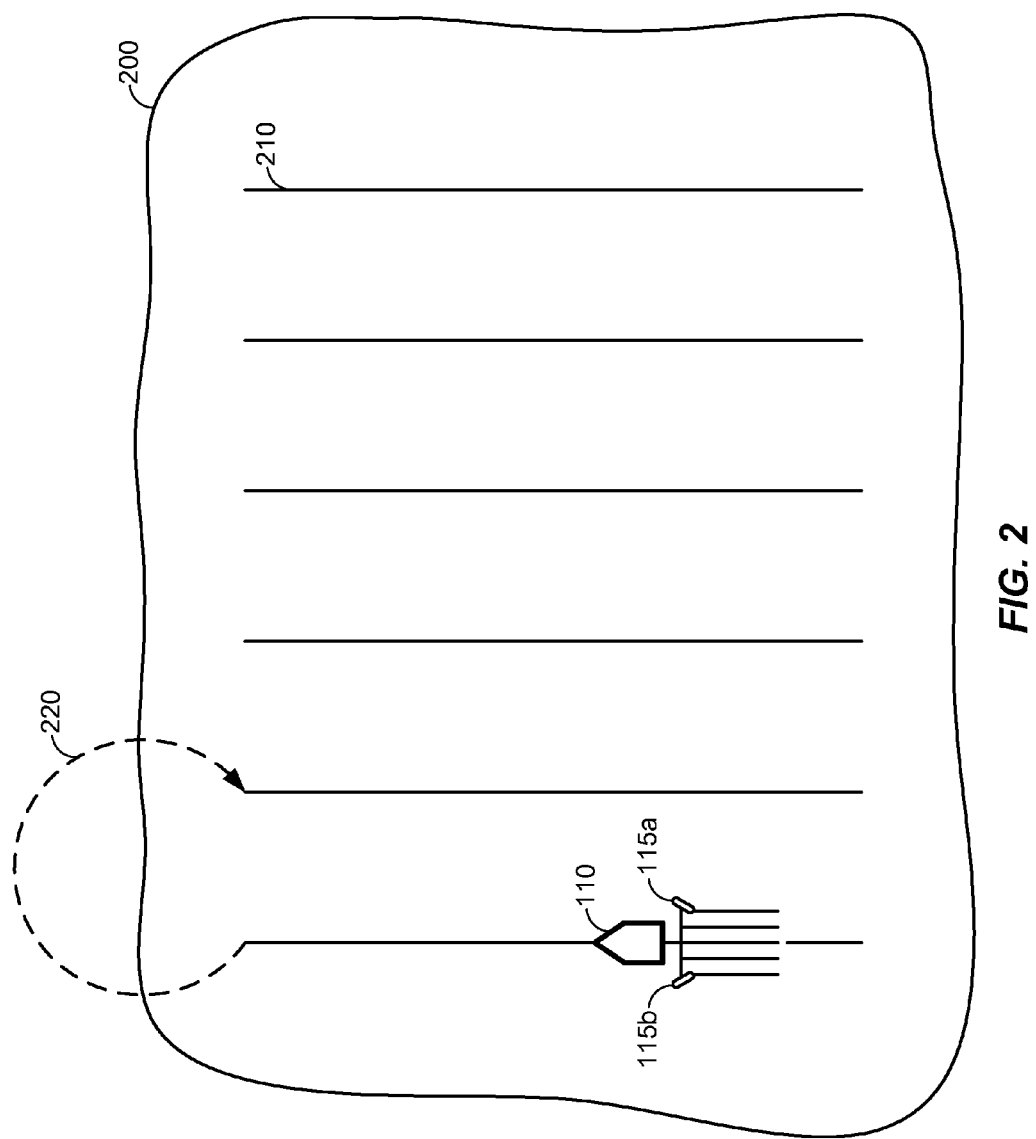
FIG. 2 illustrates a plan view of an exemplary seismic survey according to an embodiment of the invention.

The seismic source 111 may be an air gun configured to release a blast of compressed air into the water column towards the seabed 130. A blast of compressed air from the air gun 111 generates seismic waves which may travel down towards the seabed 130, and penetrate and/or reflect from sub-seabed surfaces. The reflections from the sub-surfaces may be recorded by seismic sensors 113 as seismic data. The seismic data acquired via the seismic sensors 113 may be processed to develop an image of the sub-surface layers. These images may be analyzed by geologists to identify areas likely to include hydrocarbons or other substances of interest FIG. 2 illustrates seismic surveying operations over a target area 200, according to an embodiment of the invention. As shown in FIG. 2, a plurality of sail lines 210 may be defined for conducting the survey. During seismic data acquisition the seismic vessel 110 may be configured to travel along each of the sail lines 210, as illustrated in FIG. 2. When the seismic vessel 210 reaches the end of a given sail line 210, it may perform a turn to direct its path on to a next sail line 210. A turn path 220 is illustrated in FIG. 2 as an example. While straight line sail lines 210 are shown in FIG. 2, embodiments of the invention are not limited by the particular shape of the sail lines employed. In alternative embodiments, any type of sail line including curved sail lines, spiraling sail lines, and the like may be used.

The shape of turn path 220 may depend on a variety of factors. For example while traversing the path 220, a speed of the diverter 115b may be greater than a speed of the diverter 115a because it travels a relatively greater distance in the turn. If the speed of the diverter 115b is too high, it may cause an excessive amount of tension and stress in the cables associated therewith, which may eventually sever the cables or otherwise damage critical components in the cable array. On the other hand, if the speed of the diverter 115a is too low, the diverter may lose its lift, and thereby cause a portion of the cable array to collapse. Another factor affecting the turn path is the length of the cable array. For example, long cable arrays may require a turn path with a greater radius to prevent the streamer cables from getting tangled with one other during the turn. Accordingly, a radius of the turn path 220 must be selected such that the speeds and tension on the inner and outer extremes of the cable array are within acceptable limits, and such that a desired shape of the cable array is maintained.

Conventional surveys have generally involved selecting a large enough circular turn path such that diverter speed limits and streamer shape requirements are maintained. However, this can result in an extremely long turn radius that introduces an undesirable delay and inefficiencies into the survey. Furthermore, conventional surveys determine a turn path relative to the earth. However, turn paths that are determined relative to the earth do not account for the direction and magnitude of water currents that may exist in the turn area. Embodiments of the invention provide methods for determining a shape for a particular turn relative to the moving body of water, such that the tension and speed of the diverters are maintained within acceptable limits and/or the shape of the towed streamer array is such that tangles and excessively sharp turns that put undue stress on the equipment are avoided. In some cases, embodiments of the invention may result in a reduction in the total distance travelled and time taken to complete the turn. In some embodiments, the turn radius may be dynamically adjusted based on the speed of diverters and/or tension in one or more cables while in the turn.

Figure 3A:
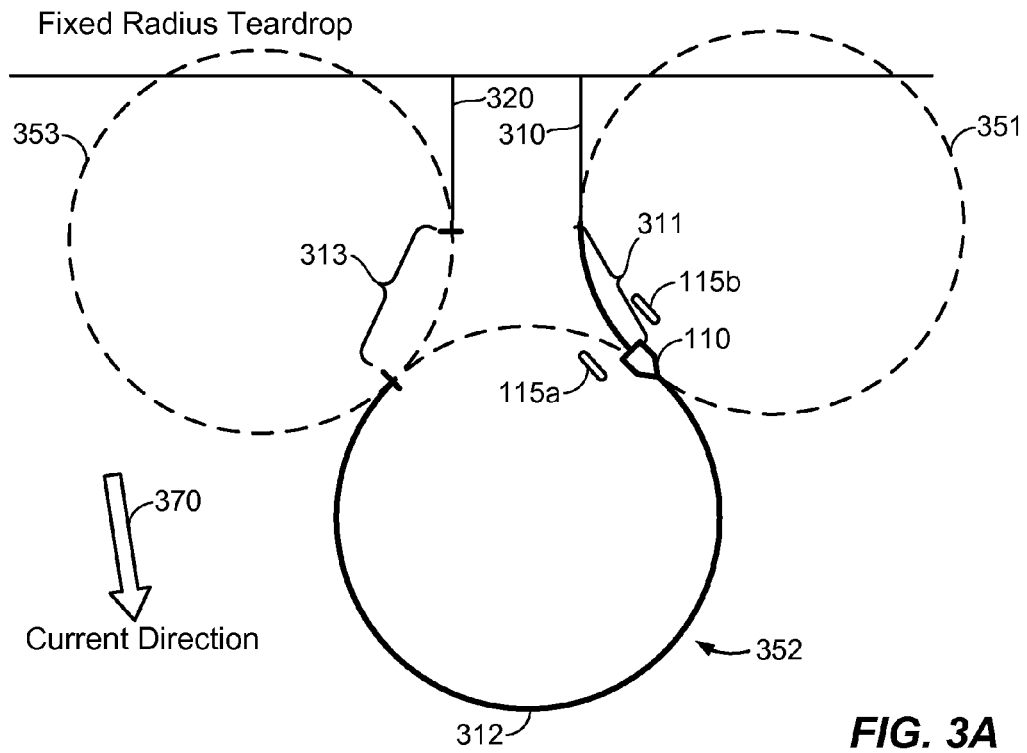
FIGS. 3A-E illustrate turning a vessel from a first sail line to a second sail line according to an embodiment of the invention.

FIGS. 3A-E illustrate an exemplary turn according to an embodiment of the invention. As illustrated in FIG. 3A, the turn path may be configured to move the seismic vessel 110 from a first sail line 310 to a second sail line 320. In one embodiment, the seismic vessel may begin the turn based on a predefined path configured to maintain the diverter 115a and 115b speeds within predefined limits. For example, a fixed radius tear drop path is shown in FIG. 3A based on sections 311, 312, and 313 respectively of circles 351, 352, and 253. Further illustrated in FIG. 3A is the current direction 370.

Figure 3B:
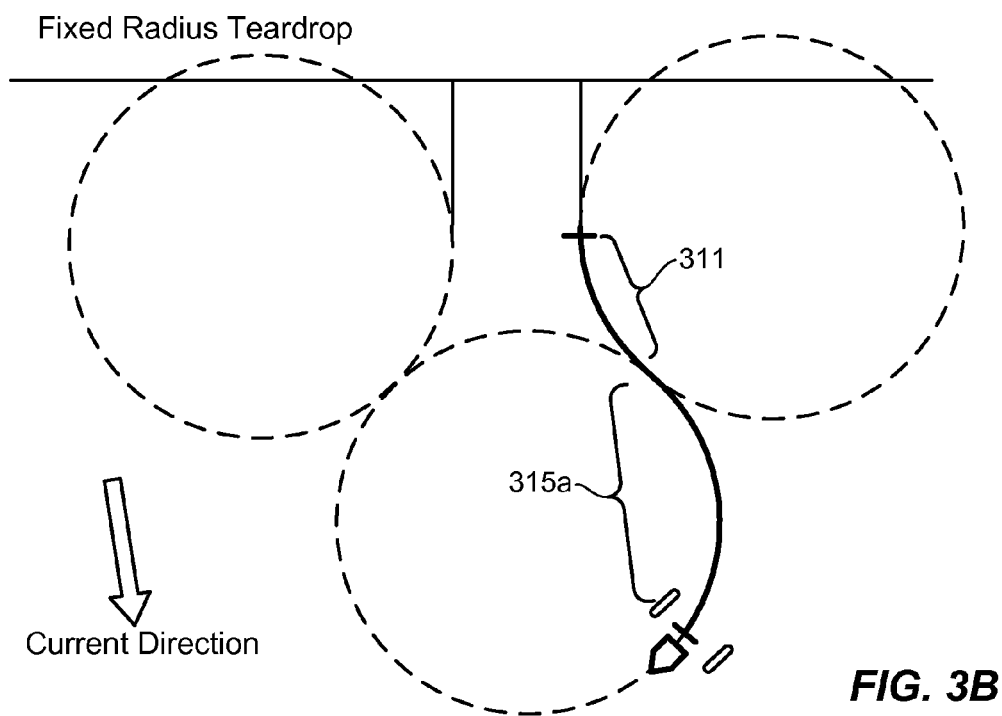
Figure 3C:
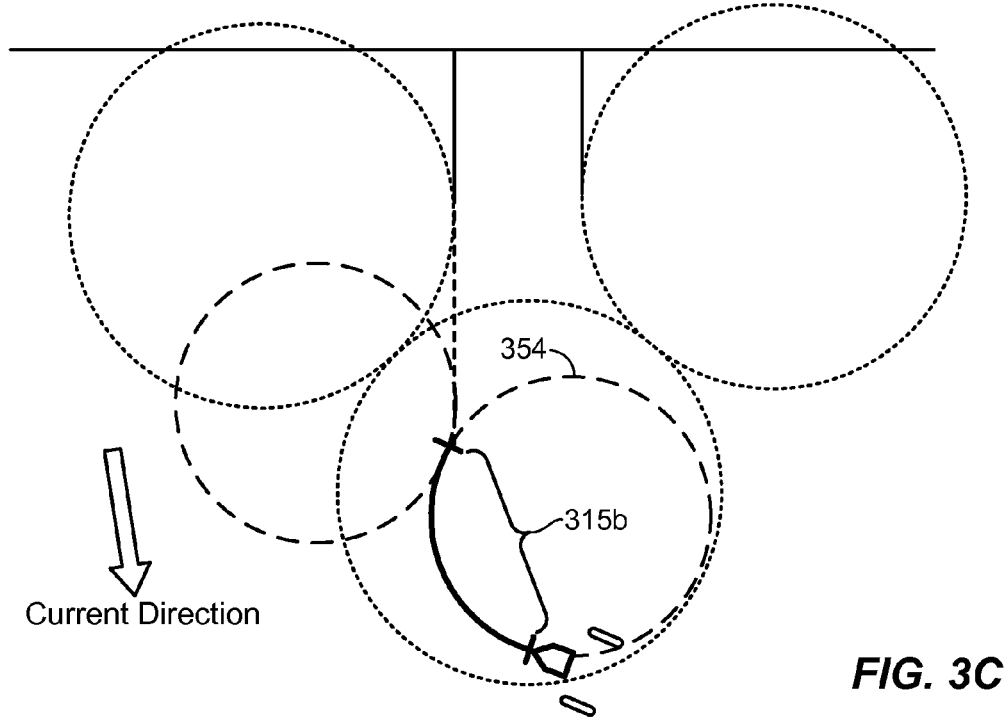
Figure 3D:
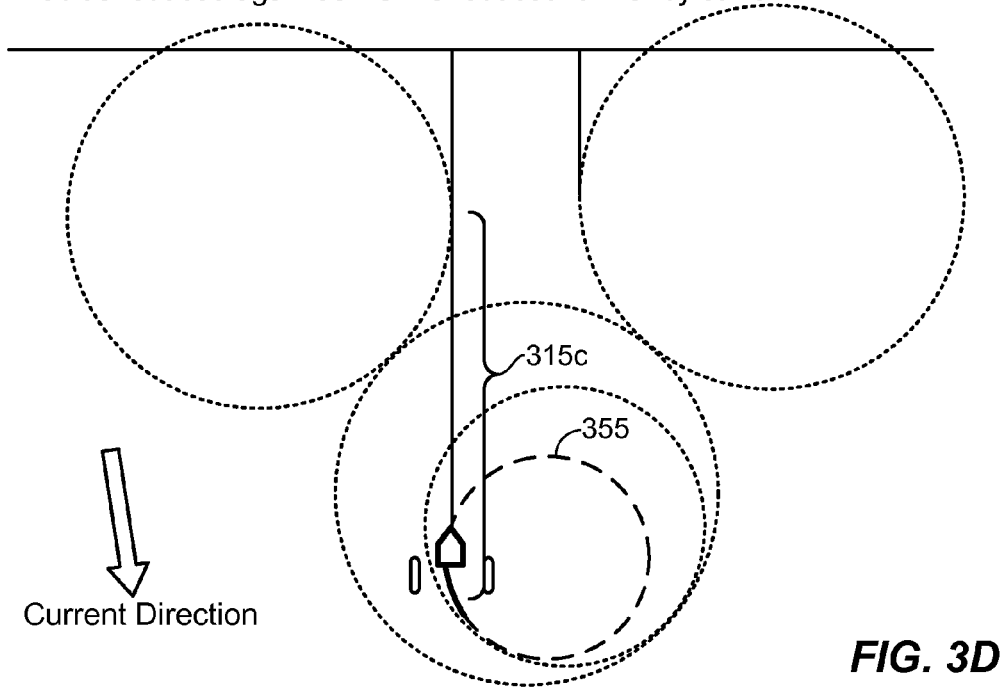
Figure 3E:
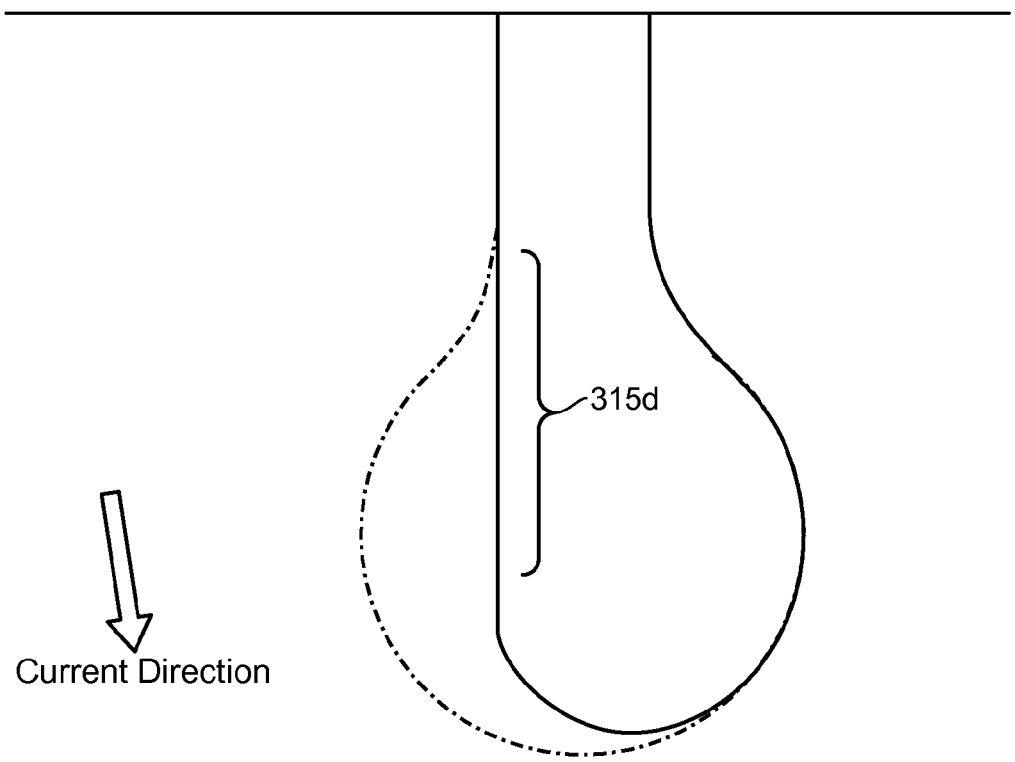

As shown in FIG. 3B, the seismic vessel may travel along the section 311 and a sub-section 315a of the section 312 because the respective sections 311 and 315a are substantially in line with the current direction and in the direction of the current, which may increase the overall speed of the vessel. However, as the end of the section 315a is approached, the direction of movement of the seismic vessel 110 may become increasingly orthogonal to the current direction, which may increase the differential in the speed and cable tension of the diverters. Accordingly, as shown in FIGS. 3C-E, the seismic vessel 110 may increase sharpness of the turn to move the seismic vessel in line with the current direction, which may balance the relative speed and cable tension in the inner and outer diverters. For example referring to FIG. 3E, by increasing the sharpness of the turn based on the direction of the water current, the distance of the turn path, and therefore the time to complete turn, may be greatly reduced. Moreover, by ensuring that the speed and cable tension around the inner and outer diverters remains balanced within acceptable limits, the probability of failure in the towed components, e.g., loss of lift in diverter, breaking or damaging of cables due to high tension, and the like, is greatly reduced.

In one embodiment, changing the sharpness of the turn may involve determining one or more turn radii. For example, in FIG. 3C, a first adjusted turn radius may be determined based on the circle 354. The size of the circle 354 may be determined based on a determination of one or more of acceptable speeds for the diverters 115a and 115b, tension in the cables, desired lift in the diverters, relative angle of attack of the current direction, and the like. For example, in FIG. 3C, the seismic vessel may be substantially orthogonal to the current direction. Accordingly, a relatively larger turn radius based on the circle 354 may be needed to avoid stress in streamer array components, to prevent the streamers from getting tangled, and the like. However, the radius of the circle 354 is smaller than the radius of the previously determined circle 352 of FIG. 3A in order to move the seismic vessel in line with the current direction more quickly.

As the seismic vessel moves along the path 315b defined by the circle 354 of FIG. 3C, and positions itself more in line with the current direction, the turn path may be further sharpened. For example, in FIG. 3D, because the seismic vessel is more in line with the current direction, the turn radius may be adjusted based on a circle 355, allowing for a more aggressive turn along the path 315c. In one embodiment, because the vessel may now be moving against the direction of current, the speed of the vessel may be slowed to reduce strain and tension on the cables and components.

In one embodiment, adjustment of the turn radius may be done continuously based on the speed of diverters and/or tension in cables at or about the diverters. For example, based on the speed of the diverters and/or the tension in cables, the turn radius may either be relaxed or sharpened. Alternatively, the adjustment of the turn radius may be performed at predefined intervals of time based on a periodic assessment of diverter speed and cable tension In one embodiment of the invention, determining the turn path may involve determining a magnitude of the current in addition to the current direction to determine the current direction and magnitude, the seismic vessel, e.g., the vessel 110 of FIG. 1 may be equipped with current sensors, for example, acoustic Doppler current profilers. In alternative embodiments, the current direction and magnitude information may be obtained via, for example, weather forecasts, a forward reconnaissance boat, or the like.

In one embodiment of the invention, a plurality of sensors may be deployed in the streamer array to determine, for example, tension in the cable, depth and speed of the diverters, and the like. Predefined acceptable ranges may also be defined for the tension in the cables and speed and tension of the diverters. If, during the turn, it is determined that the sensor measurements are outside a predefined range of acceptance, the turn radius may be further adjusted to avoid damage to the streamer components. For example, the turn radius may be sharpened or relaxed to achieve a balance between the speed and tension in inner and outer diverters.

Figure 4A:
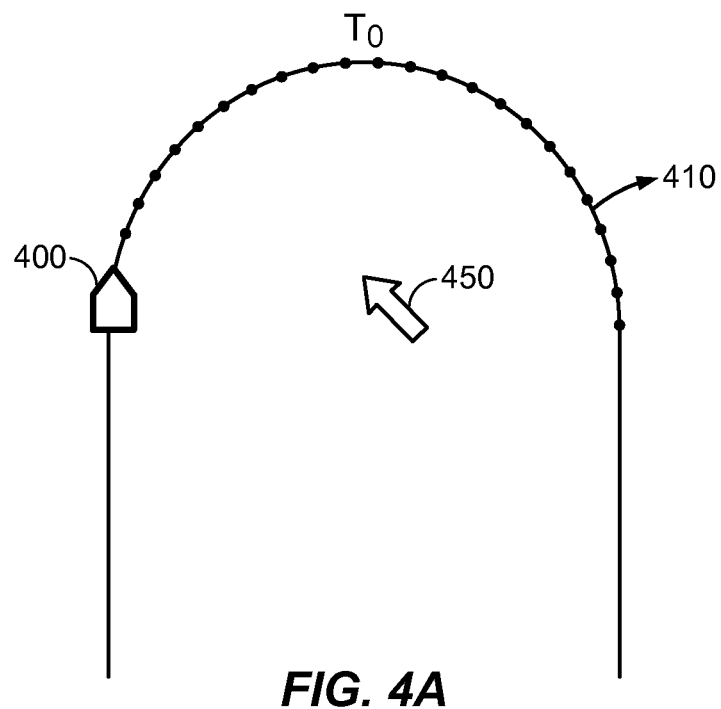
FIGS. 4A-D illustrate turning a vessel from a first sail line to a second sail line according to another embodiment of the invention.
Figure 4B:
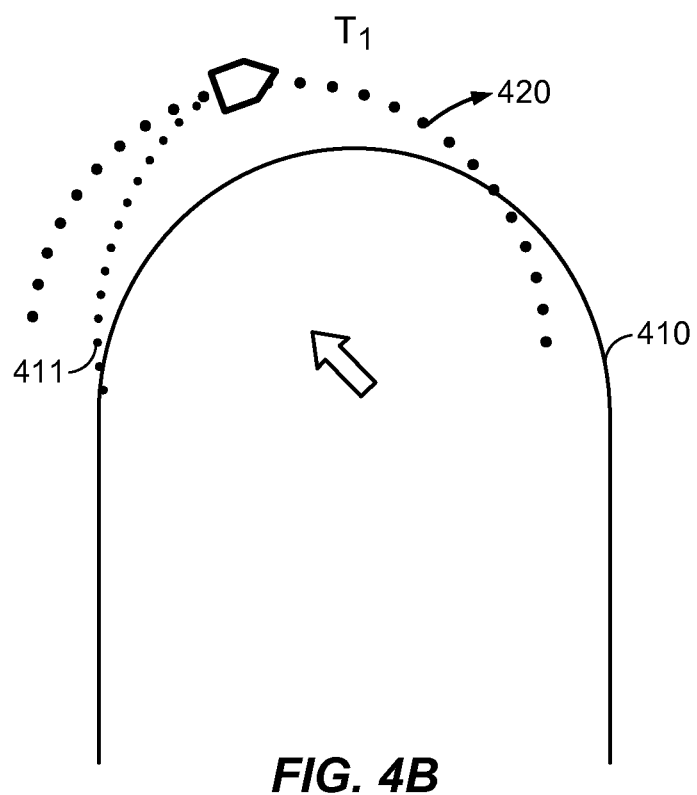
Figure 4C:
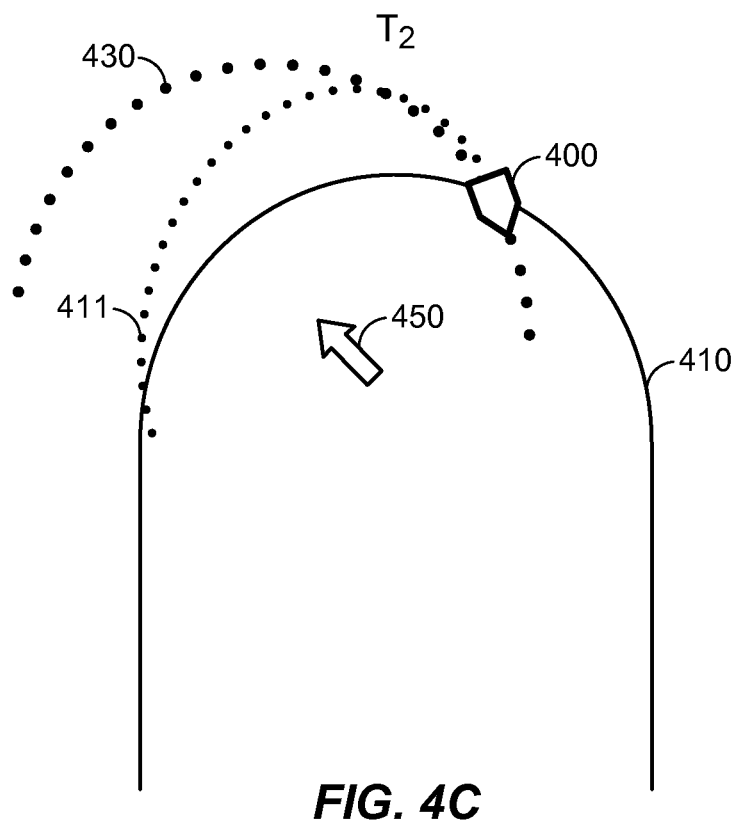
Figure 4D:
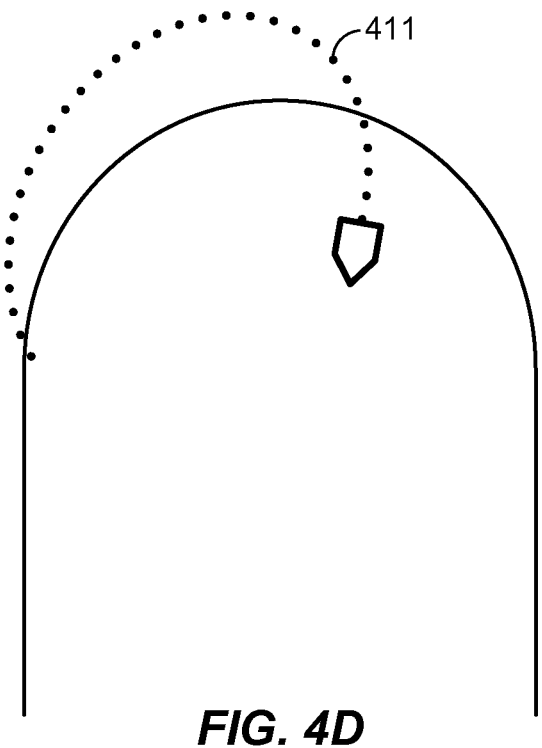

In one embodiment of the invention, the turn path may be dynamically determined while in the turn, either continuously or at predefined intervals as previously described. In alternative embodiments, the turn path may be determined ahead of entering the turn based on measured and/or expected current magnitude and direction in the turn area. Whether the turn path is determined dynamically or ahead of entering the turn, in one embodiment, the turn path may be determined relative to the moving body of water. FIGS. 4A-D illustrate a method for determining a turn path according to an embodiment of the invention. FIG. 4A illustrates a turn path 410 for a vessel 400 in a body of water that is moving in the direction 450 at a time T0. In one embodiment, the turn path 410 may be determined relative to the earth. At time T1, the turn path 410 of time T0 may be shifted to the path 420 illustrated in FIG. 4B based on the movement of the water body in the direction 450. The shifted path 420 may be determined based on the current direction 450 as well as the current magnitude, in one embodiment. Accordingly, the path 411 of the vessel 400 may be determined such that the vessel 400 is on the path 420 at time T1. At time T2, the turn path 410 of time T0 may be shifted to the path 430 illustrated in FIG. 4C based on the movement of the water body in the direction 450. Accordingly the vessel path 411 may be determined such that the vessel is located on the path 430 at time T2. FIG. 4D illustrates the final vessel turn path 411 determined based on the movement of the water body in comparison the the original turn path 410 (which is determined relative to the earth). As shown the turn path 411 allows for sharper turns that are of a shorter distance.

Figure 5A:
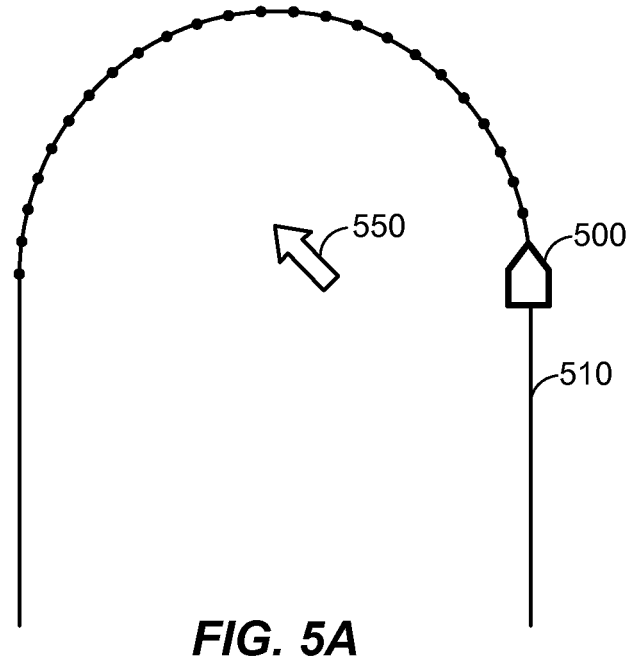
FIGS. 5A-D illustrate turning a vessel from a first sail line to a second sail line according to yet another embodiment of the invention.
Figure 5B:
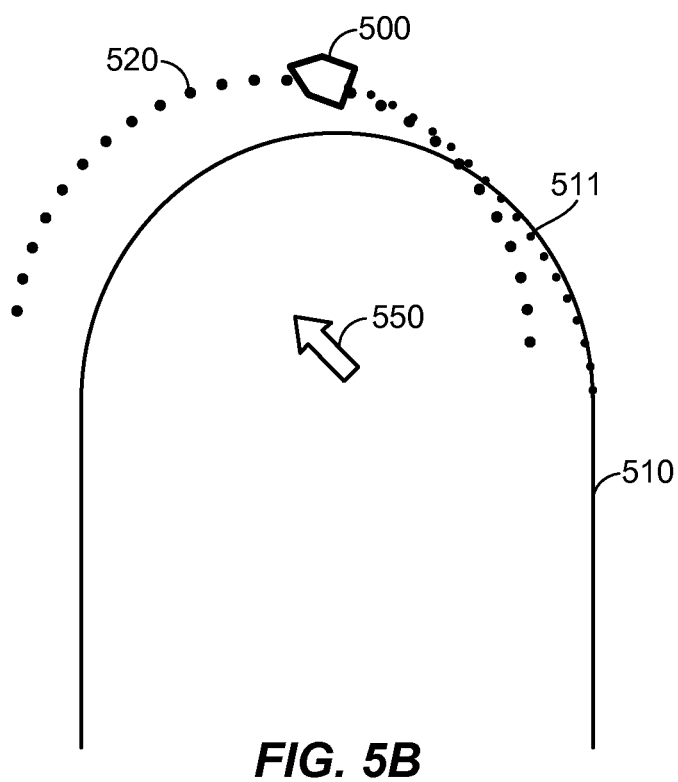
Figure 5C:
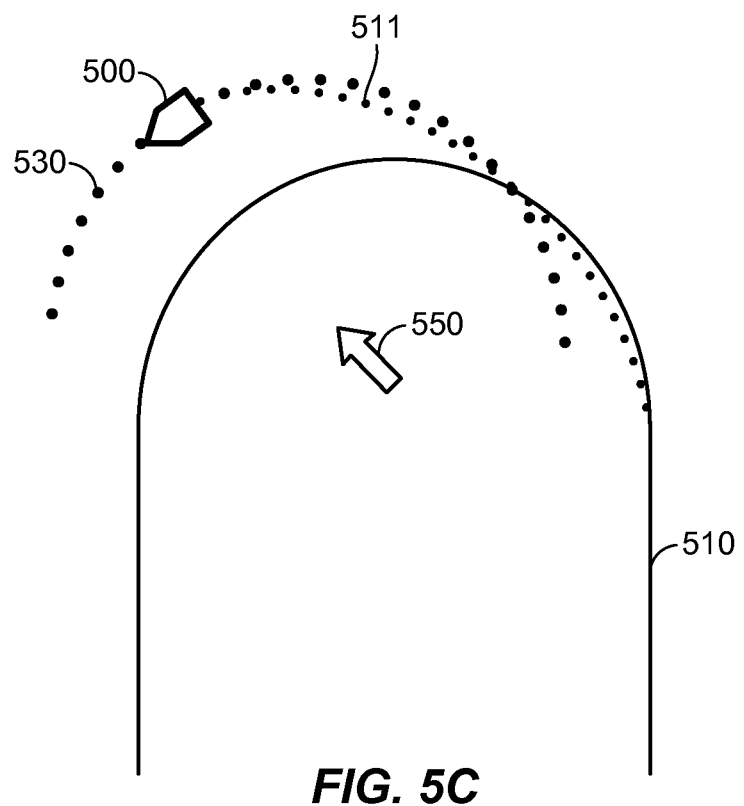
Figure 5D:
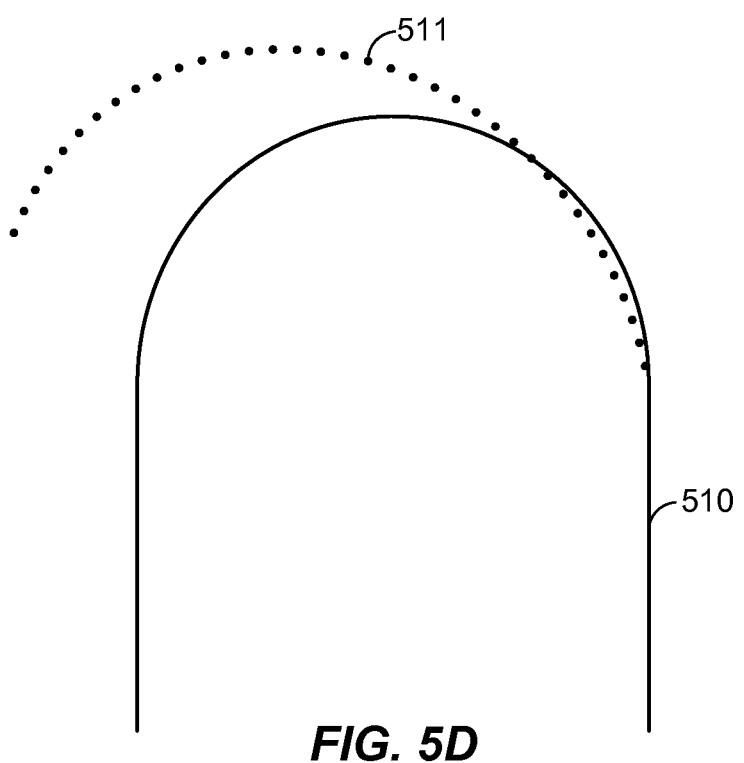

FIGS. 5A-D illustrate a method for determining a turn path according to another embodiment of the invention. FIG. 5A illustrates a turn path 510 for a vessel 500 in a body of water that is moving in the direction 550 at time T0. In one embodiment, the turn path 510 may be determined relative to the earth. At time T1, the turn path 510 of time T0 may be shifted to the path 520 illustrated in FIG. 5B based on the movement of the water body in the direction 550. The shifted path 520 may be determined based on the current direction 450 as well as the current magnitude, in one embodiment. Accordingly, the path 511 of the vessel 500 may be determined such that the vessel 500 is on the path 520 at time T1. At time T2, the turn path 510 of time T0 may be shifted to the path 530 illustrated in FIG. 5C based on the movement of the water body in the direction 550. Accordingly the vessel path 511 may be determined such that the vessel is located on the path 530 at time T2. FIG. 5D illustrates the final vessel turn path 511 determined based on the movement of the water body in comparison the the original turn path 510 (which is determined relative to the earth).

The methods illustrated in FIGS. 4A-D and 5A-D are generally configured to maintain an acceptable balance between inner and outer diverter speed and/or cable tension when completing a turn in a moving body of water. The methods of FIGS. 4A-D and 5A-D may be dynamically or periodically determined at the time of conducting a vessel turn. Alternatively, the methods of FIGS. 4A-D and 5A-D may be utilized to predetermine a turn path for a vessel prior to entering a turn. In one embodiment, a turn path may be predetermined for a vessel, but diverter speed and/or cable tension may be continuously monitored during the turn, and further adjustments to the turn path may be made to maintain an acceptable balance between inner and outer diverter speed and/or cable tension.

Figure 6A:
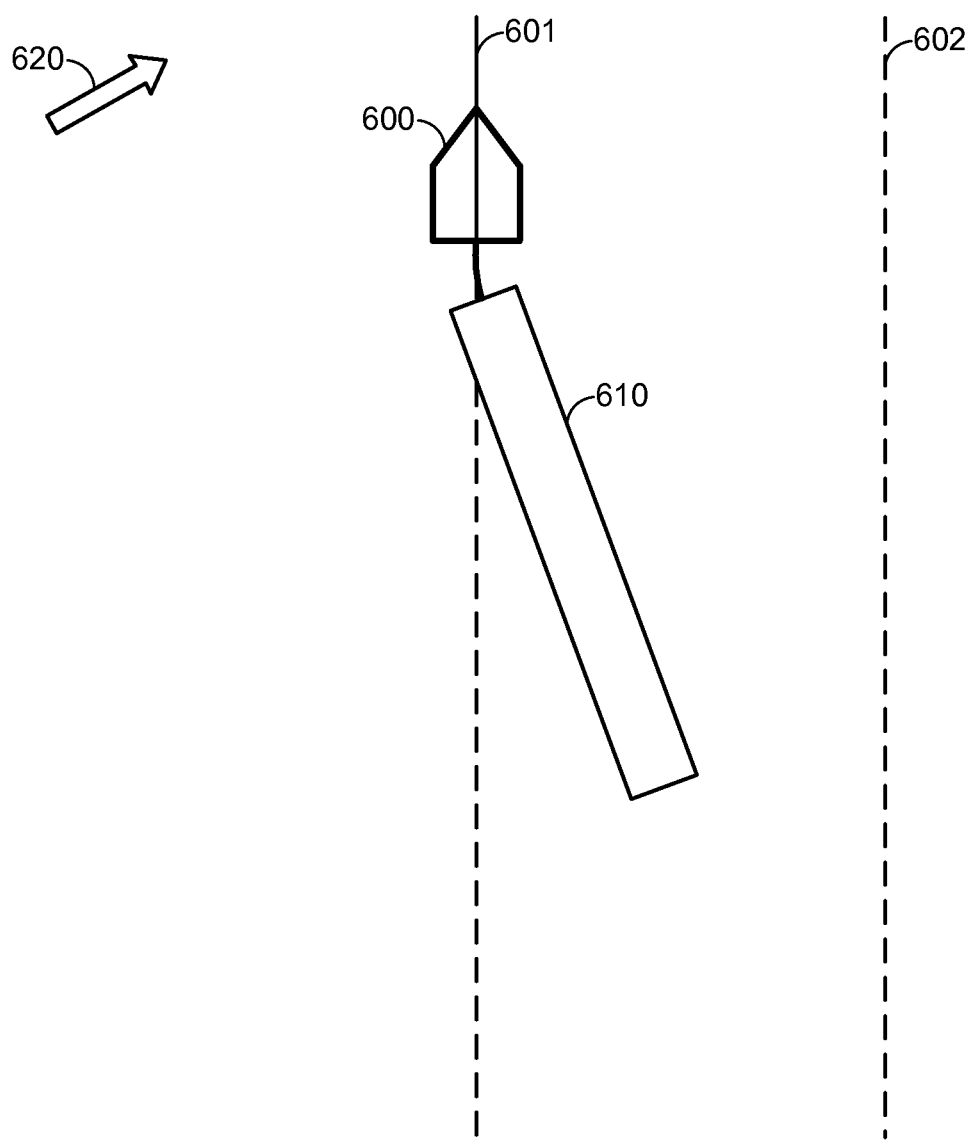
FIGS. 6A-B illustrate turning a vessel from a first sail line to a second sail line according to a prior art method.
Figure 6B:
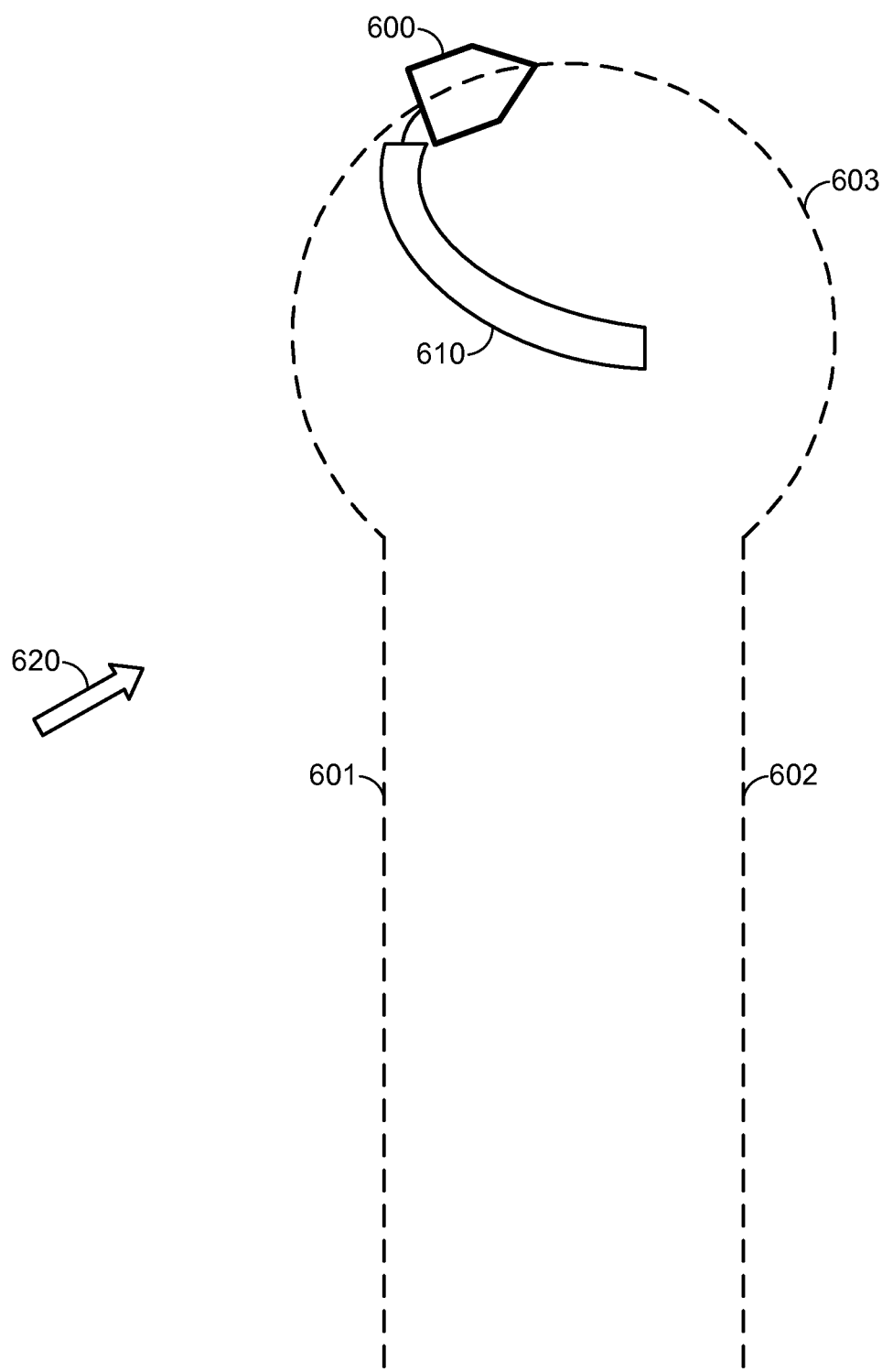

In one embodiment of the invention the turn path of a vessel from one seismic line to a second seismic line may be determined such that the shape of the towed streamer array is maintained and tangles and excessively sharp turns that put undue stress on the equipment are avoided. To determine a shape of the towed streamer array a plurality of positioning devices, e.g., global positioning satellite (GPS) devices or accoustic positioning devices may be placed at several locations in the streamer array. FIGS. 6A-B illustrate a prior art method for turning a vessel. In FIG. 6A, the vessel 600 is shown traversing along an acquisition line 601. Due to a current in the direction 620 the array 610 that is towed by the vessel 600 may be offset as shown in FIG. 6A. FIG. 6B illustrates the vessel 600 while conducting a turn from the acquisition line 601 to the acquisition line 602 along a turn path 603. As shown in FIG. 6B, due to the current direction 620, the array 610 may end up in a sharply curved position. Such sharply curved configurations may cause streamers in the array to become tangled, or in some cases, may cause the vessel 600 to run over a portion of the array while completing the turn. This may result in catastrophic damage to the streamer array, which may render it unusable.

Figure 7A:
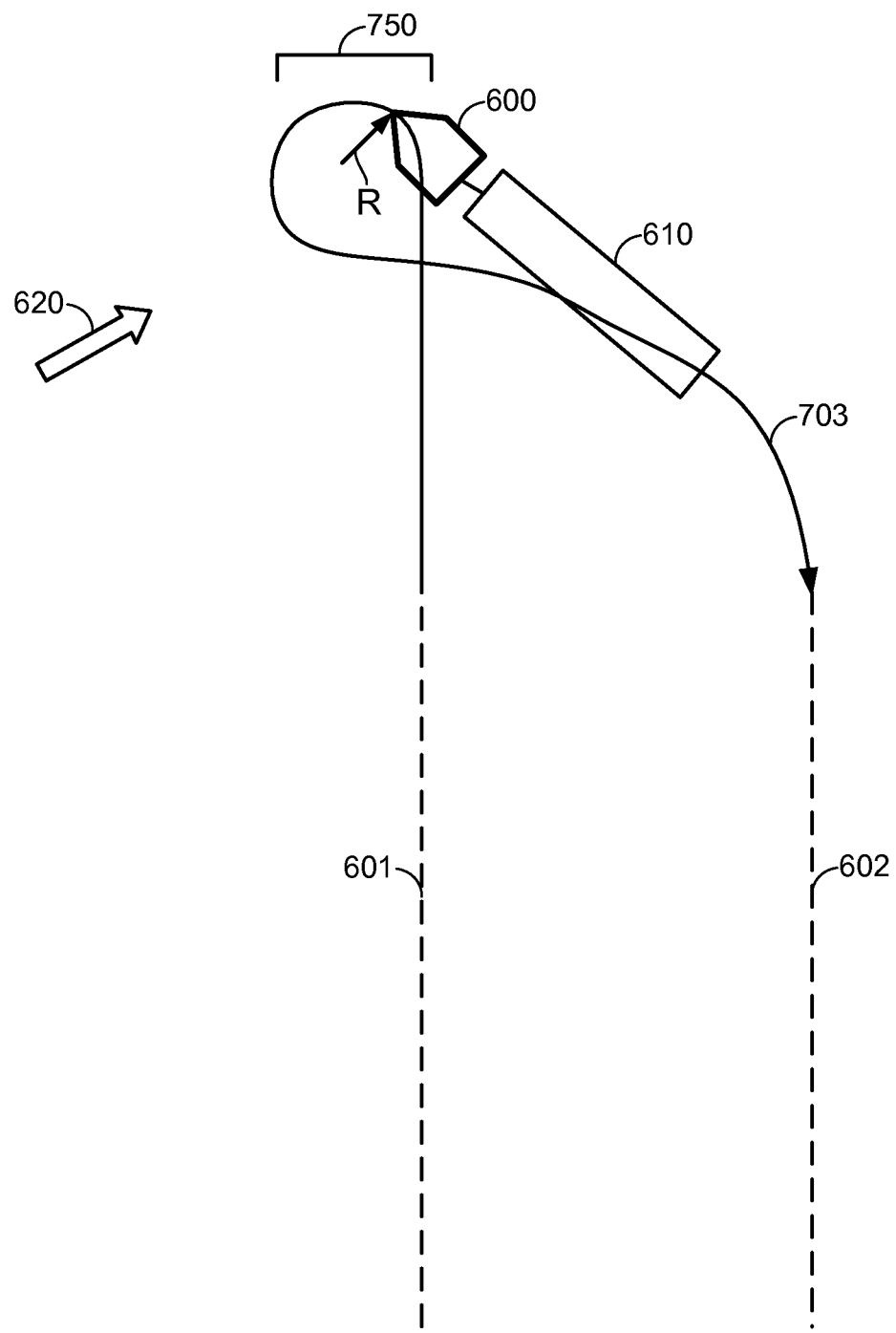
FIGS. 7A-D illustrate turning a vessel from a first sail line to a second sail line according to an embodiment of the invention
Figure 7B:
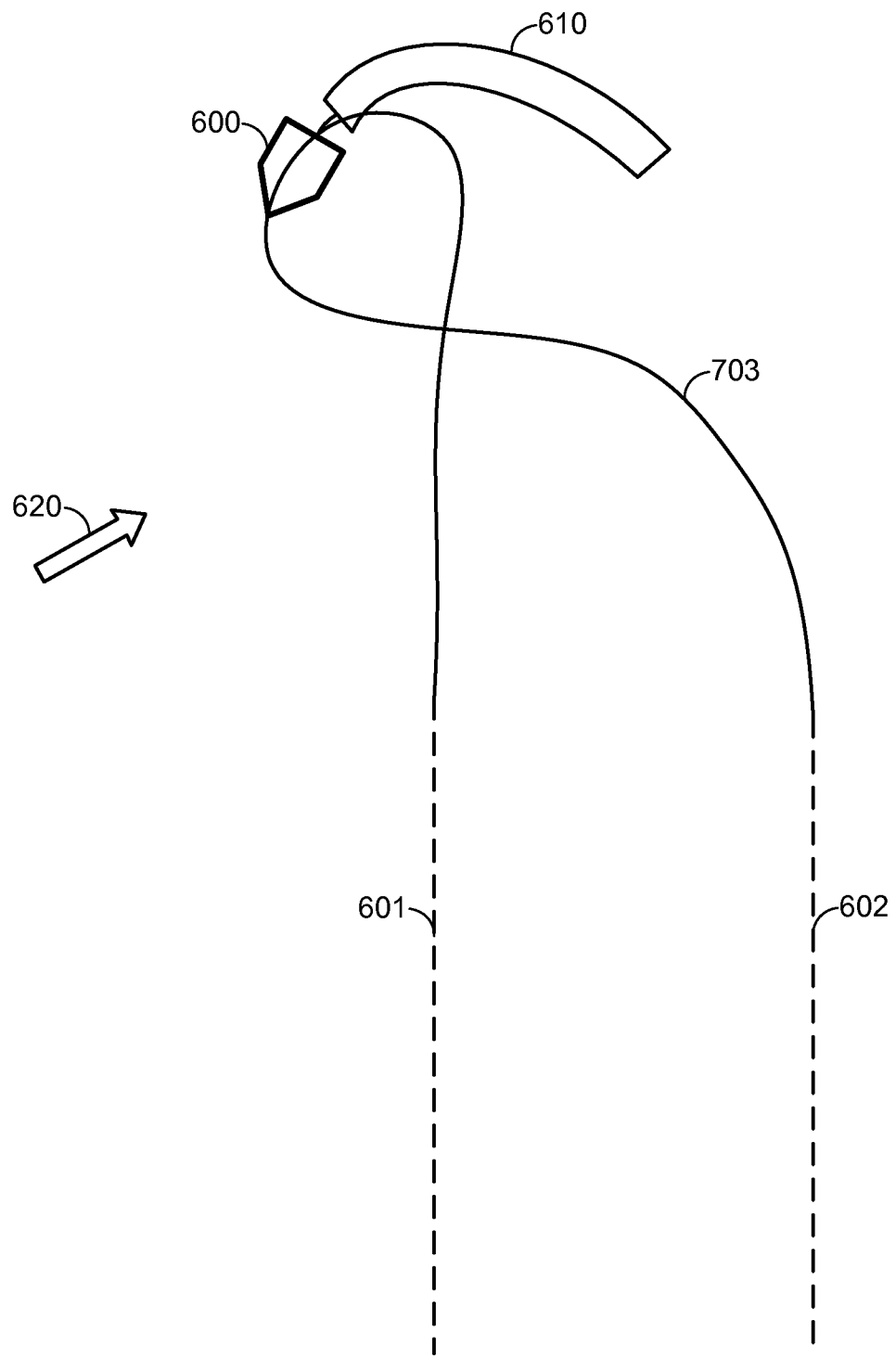
Figure 7C:
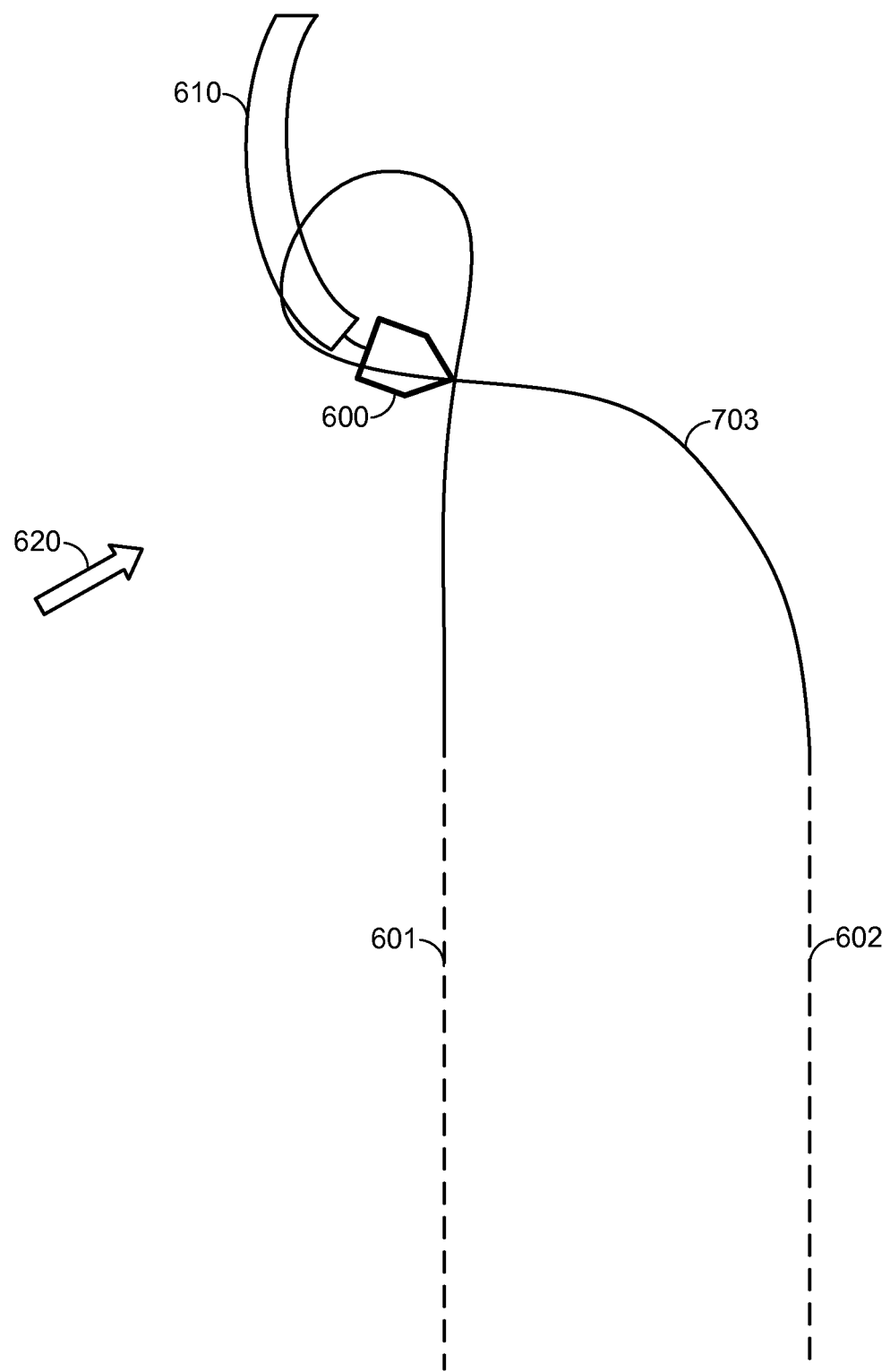
Figure 7D:
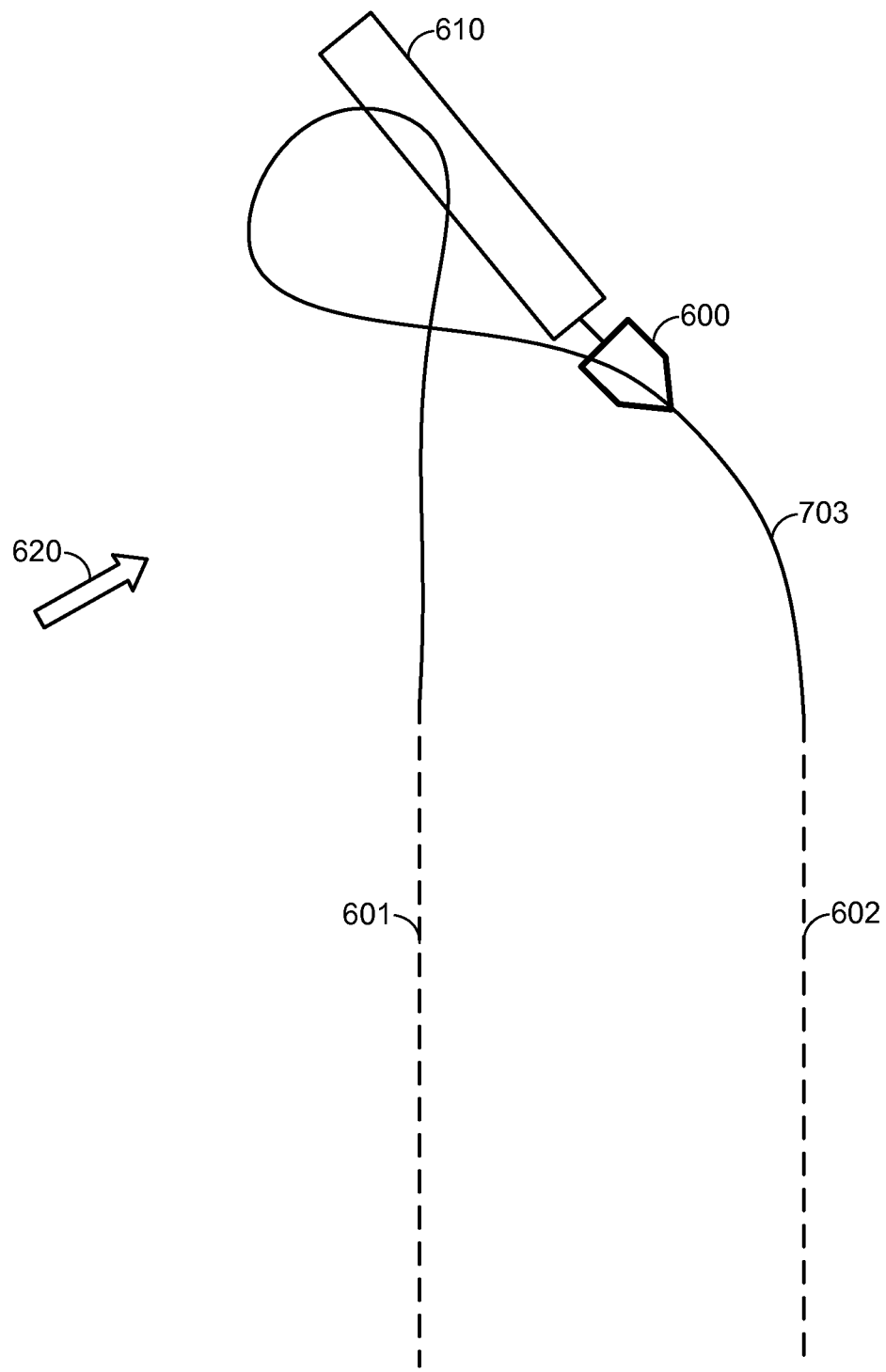

In one embodiment of the invention, a turn path may be determined such that the shape of the streamer array is maintained within acceptable limits, wherein the turn path is determined based on the current direction. FIGS. 7A—illustrate an exemplary turn path, according to an embodiment of the invention. As shown in FIG. 7A, the vessel 600 may complete a turn from the acquisition line 601 to the acquisition line 602 via a path 703. As shown in FIG. 7A, the path 703 may include a portion 750 that takes the vessel 600 away from the acquisition line 602 (eventual destination). In one embodiment the portion 750 may have a predefined radius R associated therewith. The radius R may be selected such that the current direction 620 assists with keeping the curvature in the array 610 within predefined limits of acceptance, as shown in FIGS. 7B-C. Furthermore, as shown in FIG. 7D, after completing traversal of the portion 750, the array may be positioned in a substantially straight manner, thereby facilitating acquisition along the seismic acquisition line 602.

Figure 8:
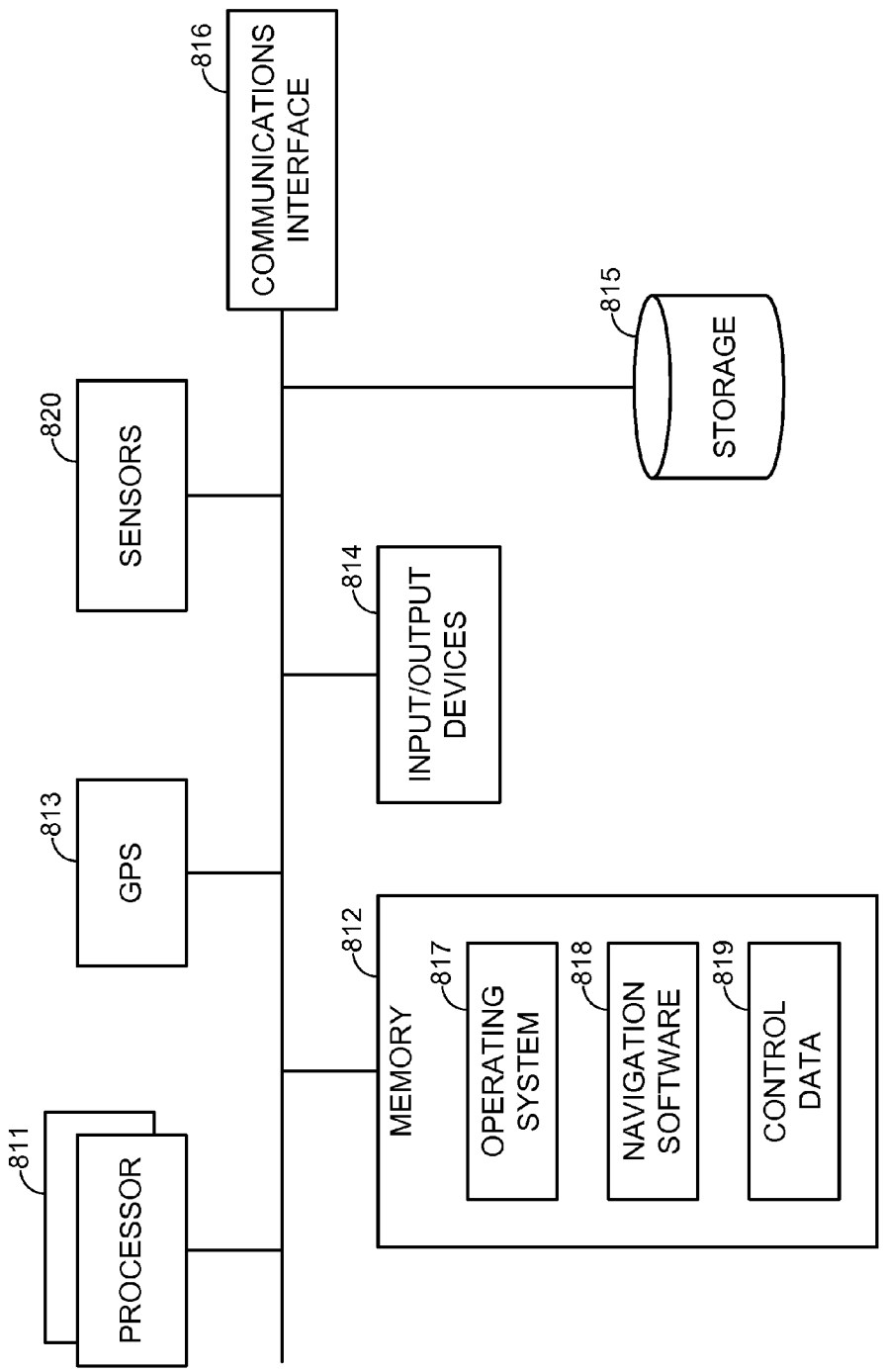
FIG. 8 illustrates an exemplary control system according to an embodiment of the invention.

FIG. 8 illustrates an exemplary control system 800 according to an embodiment of the invention. In one embodiment, the control system 800 may be implemented on a seismic vessel, e.g., the seismic vessel 110 of FIG. 1. The control system may be configured to determine a turn path for a seismic vessel as described hereinabove. As illustrated in FIG. 8, the control system 800 may include one or more processors 811, a memory 812, a global positioning satellite (GPS) device 813, input/output devices 814, storage 815, and a communications interface 816.

The input/output devices 814 may include input devices such as a mouse, keyboard, touchscreens, and the like, and output devices such as CRT monitors, LCD displays, tablet computers, and the like. Storage device 815 stores application programs and data for use by the control system 800. Typical storage devices include hard-disk drives, flash memory devices, optical media, network and virtual storage devices, and the like. The communications interface 616 may connect the control system 800 to any kind of data communications network, including either wired networks, wireless networks, or a combination thereof. In one embodiment, the communications interface 616 may be utilized to acquire weather data, for example, the direction and magnitude of current in a particular area.

The sensors 820 may include current sensors for determining the current direction and magnitude, sensors for determining tension in one or more cables in the streamer cable array, sensors for determining speed of one or more diverters, and the like. Current data acquired via the communications interface 816 or via the sensors 820 may be stored as control data 819 in the memory 812.

The memory 812 is preferably a random access memory sufficiently large to hold the necessary programming and data structures of the invention. While memory 812 is shown as a single entity, it should be understood that memory 812 may in fact comprise a plurality of modules, and that memory 812 may exist at multiple levels, from high speed registers and caches to lower speed but larger DRAM chips.

Illustratively, the memory 812 contains an operating system 817. Well known examples of operating systems include the Windows® operating system, distributions of the Linux® operating system, and IBM's AIX and OS/2® operating systems, among others. More generally, any operating system supporting the functions disclosed herein may be used.

Memory 812 is also shown containing a navigation program 818 which, when executed by the processor 811, provides support for determining a turn path for a seismic vessel. For example, in one embodiment, the navigation software may determine a position of a seismic vessel conducting a survey (via e.g., GPS data from the GPS device 813) along a sail line. If the seismic vessel approaches an end of the sail line, the navigation program 818 may determine a turn path for positioning the seismic vessel from the end of the current sail line to the beginning of a new sail line, wherein the turn path is determined based on current data, speed of inner and outer diverters, inner and outer cable tension, and/or to keep a shape of the seismic array within acceptable limits during the turn. Alternatively, the navigation program 818 may determine a first predefined turn path and continuously or periodically adjust the turn path while in the turn based on current data, speed of inner and outer diverters, and/or inner and outer cable tension, as described above.

Figure 9:
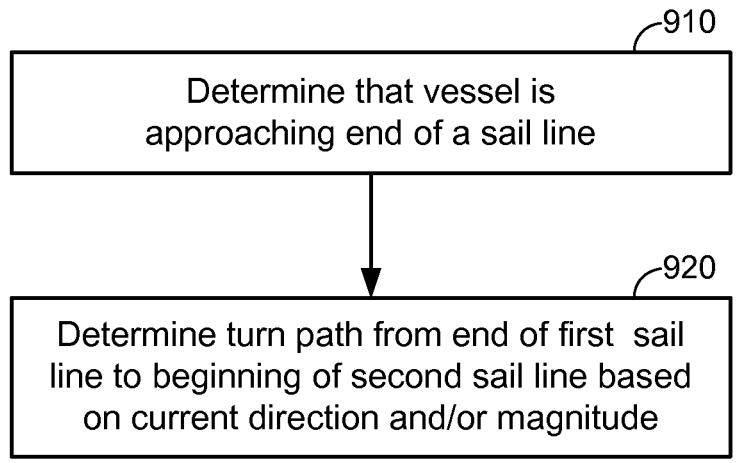
FIG. 9 is a flow diagram of exemplary operations that may be performed during a seismic survey according to an embodiment of the invention.

FIG. 9 is a flow diagram of exemplary operations that may be performed during a seismic survey, according to an embodiment of the invention. The operations may begin in step 910 by determining that a seismic vessel is approaching an end of a sail line. In step 920, a turn path from the end of the first sail line to the beginning of the second sail line may be determined, wherein the turn path is determined based on at least one of current direction and current magnitude. The turn path may be determined, for example, by a navigation program 818.

Figure 10:
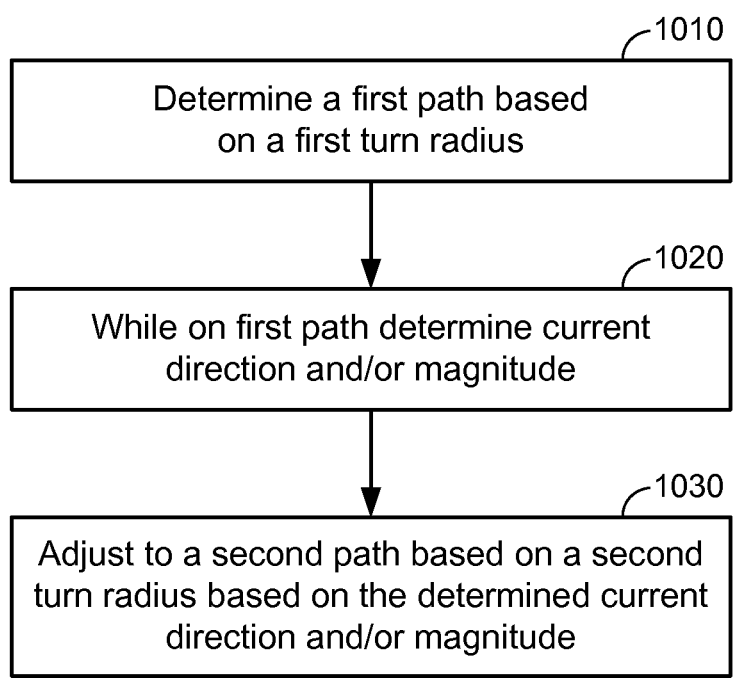
FIG. 10 is another flow diagram of exemplary operations that may be performed during a seismic survey according to an embodiment of the invention.

FIG. 10 is another flow diagram of exemplary operations that may be performed during a seismic survey to turn a marine vessel from a first sail line to a second sail line, according to an embodiment of the invention. The operations may begin in step 1010 by determining a first path based on a first turn radius. Thereafter in step 1020, while traversing on the first path, at least one of a current direction and current magnitude may be determined. Then in step 1030, the path of the marine vessel may be adjusted to a second path based on a second turn radius based on the determined at least one of current direction and current magnitude.

While the foregoing is directed to embodiments of the present invention, other and further embodiments of the invention may be devised without departing from the basic scope thereof, and the scope thereof is determined by the claims that follow. For example, embodiments of the invention are described herein with respect to seismic data acquisition operations. However, embodiments of the invention may be utilized by any type of marine vessel towing any type of item that is in tow, to transition from a first sail line to a second sail line.

What is claimed is:

1. A method for operating a marine vessel comprising: determining, via at least one processor, that an end of a first sail line is approaching; and determining, via the at least one processor, a turn path from the end of the first sail line to a beginning of a second sail line, wherein the turn path is dynamically determined based on at least one of current direction and current magnitude; while traversing on a turn path, monitoring, via the at least one processor, one or more sensors to determine whether sensor readings are within an acceptable limit; and if the sensor readings are not within acceptable limits, adjusting, via the at least one processor, the previously determined turn path.

2. The method of claim 1, wherein the marine vessel is a seismic data acquisition vessel configured to tow an array of seismic streamer cables.

3. The method of claim 1, wherein the turn path comprises at least a first section based on a first turn radius and a second section based on a second turn radius.

4. The method of claim 1, wherein the sensors are configured to measure at least one of: speed of a diverter; tension in one or more cable towing arrangements; and a shape of the cable towing arrangement.

5. The method of claim 1, further comprising periodically measuring, via the at least one processor, the current direction and current magnitude while traversing the turn path, and adjusting, via the at least one processor, the turn path upon identifying a change in at least one of the current direction and current magnitude.

6. A method for turning a marine vessel from a first sail line to a second sail line, comprising: determining, via at least one processor, a first path based on a first turn radius; while traversing on the first path, determining, via the at least one processor, at least one of a current direction and current magnitude; and based on the determined at least one of the current direction and current magnitude, adjusting, via the at least one processor, to a second path based on a second turn radius; while traversing on the turn path, monitoring, via the at least one processor, one or more sensors to determine whether sensor readings are within an acceptable limit; and if the sensor readings are not within acceptable limits, adjusting, via the at least one processor, the previously determined turn path.

7. The method of claim 6, wherein the marine vessel is a seismic data acquisition vessel configured to tow an array of seismic streamer cables.

8. The method of claim 6, wherein the sensors are configured to measure at least one of: speed of a diverter; tension in one or more cable towing arrangements; and a shape of the cable towing arrangement.

9. A non-transient computer readable storage medium comprising a computer program product which, when executed by a processor, is configured to perform operations, comprising: determining that a marine vessel is approaching an end of a first sail line; and determining a turn path from the end of the first sail line to a beginning of a second sail line, wherein the turn path is dynamically determined based on at least one of current direction and current magnitude; while traversing on the turn path, monitoring one or more sensors to determine whether sensor readings are within an acceptable limit; and if the sensor readings are not within acceptable limits, adjusting the previously determined turn path.

10. The non-transient computer readable storage medium of claim 9, wherein the marine vessel is a seismic data acquisition vessel configured to tow an array of seismic streamer cables.

11. The non-transient computer readable storage medium of claim 9, wherein the turn path comprises at least a first section based on a first turn radius and a second section based on a second turn radius.

12. The non-transient computer readable storage medium of claim 9, wherein the sensors are configured to measure at least one of: speed of a diverter; tension in one or more cable towing arrangements; and a shape of the cable towing arrangement.

* * * * *